United States Patent
Li

(10) Patent No.: US 9,496,781 B2
(45) Date of Patent: Nov. 15, 2016

(54) SOFT START CIRCUIT FOR SWITCHING CONVERTER AND ASSOCIATED SOFT START METHOD

(71) Applicant: Chengdu Monolithic Power Systems Co., Ltd., Chengdu (CN)

(72) Inventor: Lei Li, Chengdu (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 53 days.

(21) Appl. No.: 14/703,706

(22) Filed: May 4, 2015

(65) Prior Publication Data

US 2015/0326106 A1    Nov. 12, 2015

(30) Foreign Application Priority Data

May 6, 2014   (CN) .......................... 2014 1 0188085

(51) Int. Cl.
| | |
|---|---|
| *H02M 1/36* | (2007.01) |
| *H02M 3/156* | (2006.01) |
| *H02M 3/158* | (2006.01) |
| *H02M 1/00* | (2006.01) |

(52) U.S. Cl.
CPC .............. *H02M 1/36* (2013.01); *H02M 3/156* (2013.01); *H02M 3/158* (2013.01); *H02M 2001/0032* (2013.01); *H02M 2001/0038* (2013.01)

(58) Field of Classification Search
CPC ....... H02M 1/36; H02M 3/156; H02M 3/158
See application file for complete search history.

(56) References Cited

U.S. PATENT DOCUMENTS

| | | | |
|---|---|---|---|
| 7,208,927 B1 | 4/2007 | Nguyen | |
| 2004/0228152 A1* | 11/2004 | Solie | H02M 1/36 363/49 |
| 2008/0138953 A1 | 6/2008 | Challa et al. | |
| 2009/0174385 A1* | 7/2009 | Yen | H02M 1/36 323/288 |
| 2011/0278650 A1 | 11/2011 | Tamaki et al. | |
| 2011/0279045 A1* | 11/2011 | Uchimoto | H02M 1/36 315/186 |
| 2014/0300336 A1 | 10/2014 | Li et al. | |
| 2015/0042299 A1 | 2/2015 | Li | |
| 2015/0162830 A1* | 6/2015 | Dong | H02M 3/158 323/271 |
| 2015/0194888 A1* | 7/2015 | Kasai | H02M 3/158 323/271 |

* cited by examiner

*Primary Examiner* — Jessica Han
*Assistant Examiner* — Bart Iliya

(57) ABSTRACT

A soft start circuit for a switching converter, the soft start circuit has an internal soft start voltage generating circuit, an amplifier circuit and a buffer circuit, the internal soft start voltage generating circuit provides an internal soft start voltage, the amplifier circuit has a first input terminal receiving the internal soft start voltage, a second input terminal receiving a soft start reference signal and an output terminal, the buffer circuit has an input terminal coupled to the output terminal of the amplifier circuit and an output terminal providing the soft start reference signal. An external soft start capacitor coupled to the output terminal of the amplifier circuit is charged to provide an external soft start voltage, and the soft start reference signal is provided based on the internal soft start voltage and the external soft start voltage.

20 Claims, 6 Drawing Sheets

SOFT START CIRCUIT FOR SWITCHING CONVERTER AND ASSOCIATED SOFT START METHOD

CROSS-REFERENCE TO RELATED APPLICATION(S)

This application claims the benefit of CN application No. 201410188085.0, filed on May 6, 2014, and incorporated herein by reference.

TECHNICAL FIELD

The present invention relates to electrical circuit, more particularly but not exclusively relates to switching converter.

BACKGROUND

Switching converter is widely used recently in portable electronic device due to high efficiency, fast transient response and small size. However, it is easy to produce surge current during startup of a switching converter, and an output voltage may overshoot to damage the switching converter and other devices. As a result, a soft start circuit is needed.

A traditionally method to implement soft start of the switching converter is to provide a ramping up soft start reference signal during startup through charging a soft start capacitor by a current source, and the output voltage follows the soft start reference signal and increases slowly. However, the soft start capacitor usually has a large capacitance and is not convenient to be integrated, which will increase size and cost of the switching converter. Another method to implement soft start of the switching converter is to design a customized integrated soft start circuit. However, one disadvantage of this method is that the soft start time period is fixed and inflexible.

SUMMARY

It is one of the objects of the present invention to provide a switching converter, a soft start circuit and associated soft start method for the switching converter.

One embodiment of the present invention discloses a soft start circuit for a switching converter, the soft start circuit comprising: an internal soft start voltage generating circuit having an output terminal configured to provide an internal soft start voltage; an amplifier circuit having a first input terminal, a second input terminal and an output terminal, wherein the first input terminal is coupled to the output terminal of the internal soft start voltage generating circuit to receive the internal soft start voltage, and the second input terminal is configured to receive a soft start reference signal or a feedback signal indicative of the soft start reference signal; and a buffer circuit having an input terminal and an output terminal, wherein the input terminal is coupled to the output terminal of the amplifier circuit, and the output terminal is configured to provide the soft start reference signal; wherein when the output terminal of the amplifier circuit is coupled to an external soft start capacitor, the external soft start capacitor is charged by the amplifier circuit to provide an external soft start voltage, and the soft start circuit is configured to provide the soft start reference signal based on the internal soft start voltage and the external soft start voltage.

Another embodiment of the present invention discloses a switching converter integrated on an integrated circuit, wherein the integrated circuit having a soft start pin, the switching converter comprising: an output terminal configured to provide an output voltage; an error amplifier configured to receive a soft start reference signal, an output reference signal and an output feedback signal indicative of the output voltage, wherein the error amplifier is configured to provide an error signal based on the soft start reference signal, the output reference signal and the output feedback signal; a slope compensation circuit configured to provide a slope signal; a logic circuit coupled to the error amplifier and the slope compensation circuit to receive the error signal and the slope signal, the logic circuit is configured to provide a switching control signal based on the error signal and the slope signal; a switch configured to be turned ON and turned OFF by the switching control signal; and a soft start circuit comprising: a first current source configured to provide a first current; an internal soft start capacitor coupled to the first current source, the internal soft start capacitor is charged by the first current and is configured to provide an internal soft start voltage; an amplifier circuit having a first input terminal, a second input terminal and an output terminal, wherein the first input terminal is coupled to the internal soft start capacitor to receive the internal soft start voltage, the second input terminal is configured to receive the soft start reference signal, and the output terminal is coupled to the soft start pin; a bias current source comprising an output terminal configured to provide a bias current to the amplifier circuit; and a buffer circuit having an input terminal and an output terminal, wherein the input terminal is coupled to the output terminal of the amplifier circuit, and the output terminal is configured to provide the soft start reference signal.

Yet another embodiment of the present invention discloses a soft start method for a switching converter, comprising: providing an internal soft start voltage through charging an internal soft start capacitor by a first current; providing a bias current to an amplifier circuit, wherein the amplifier circuit comprising a first input terminal configured to receive the internal soft start voltage, a second input terminal configured to receive a soft start reference signal or a feedback signal indicative of the soft start reference signal and an output terminal; providing an external soft start voltage through charging an external soft start capacitor by the amplifier circuit, wherein the external soft start capacitor is coupled to the output terminal of the amplifier circuit; providing the soft start reference signal through a buffer circuit, wherein the buffer circuit has an input terminal coupled to the output terminal of the amplifier circuit; and controlling a soft start time period of the switching converter based on either the internal soft start voltage or an external soft start voltage.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to a soft start circuit for a switching converter, and associated soft start method. As used hereinafter, the term "couple" generally refers to multiple ways including a direct connection with an electrical conductor and an indirect connection through intermediaries such as diode, resistor.

Figure 1:
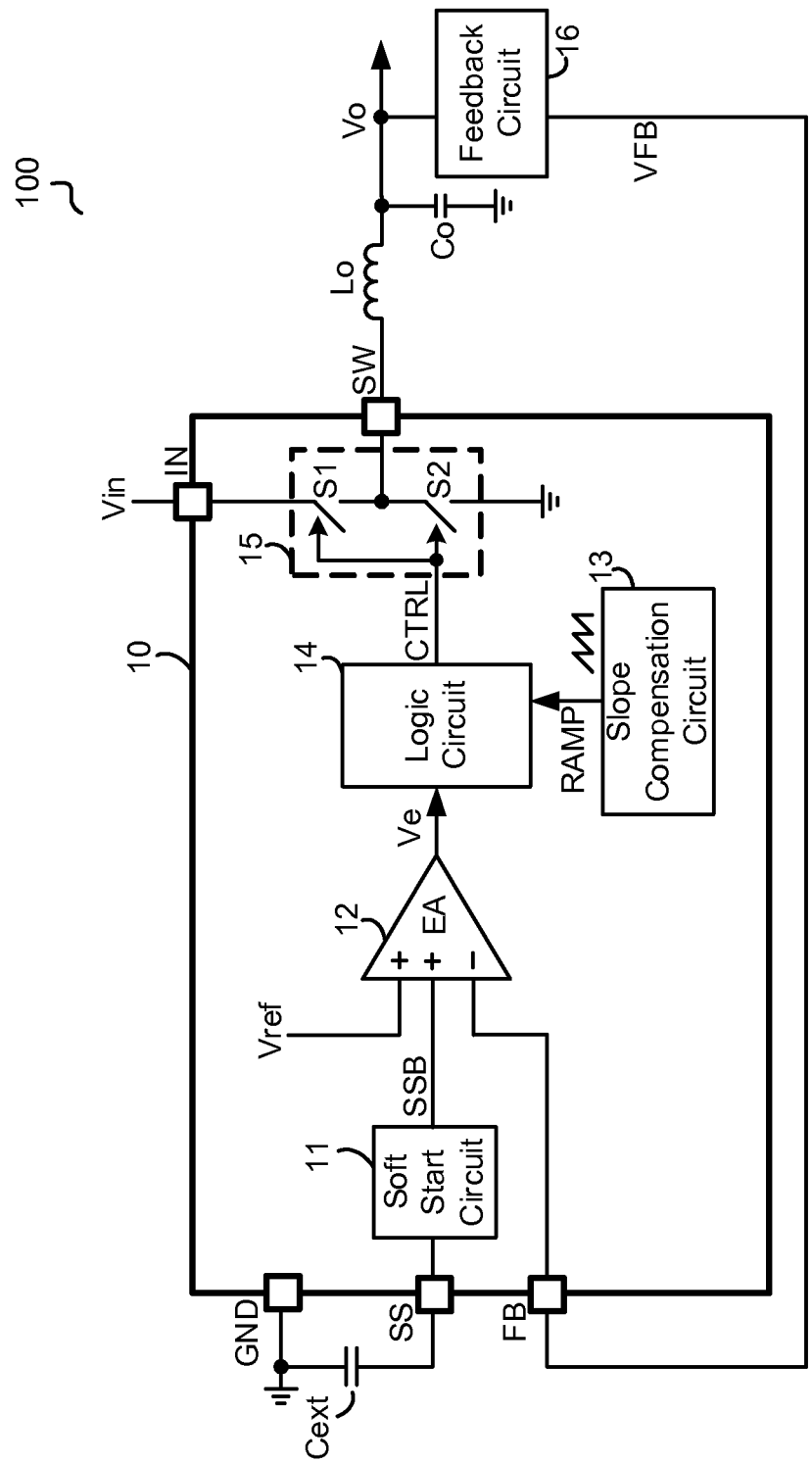
FIG. 1 illustrates a block diagram of a switching converter 100 according to an embodiment of the present invention.

FIG. 1 illustrates a block diagram of a switching converter 100 according to an embodiment of the present invention. Switching converter 100 comprises an integrated circuit 10, and an output filter comprising an output inductor Lo and an output capacitor Co. Integrated circuit 10 is integrated on an integrated circuit. As shown in FIG. 1, switching converter 100 employs step down topology as one example; however, one with ordinary skill in the art will appreciate that any other suitable topologies, such as step up converter, flyback converter, feedforward converter and so on, may be used without detracting from merits of the present invention.

Integrated circuit 10 comprises a soft start circuit 11, an error amplifier 12, a slope compensation circuit 13, a logic circuit 14, and a switching circuit 15. Symbols "IN", "SW", "FB", "SS", and "GND" represent pins of integrated circuit 10. Pin IN is configured to receive an input voltage Vin, pin SW is coupled to one terminal of output inductor Lo, pin FB is configured to receive a voltage feedback signal VFB indicative of an output voltage Vo, pin GND is coupled to a system ground, and an external soft start capacitor Cext is coupled between pins SS and GND. Switching converter 100 further comprises feedback circuit 16 configured to provide voltage feedback signal VFB based on output voltage Vo.

Soft start circuit 11 has an input terminal coupled to Pin SS, and an output terminal configured to provide a soft start reference signal SSB. When pin SS is floating, soft start reference signal SSB increases with a predetermined slope, and a soft start time period of switching converter 100 is predetermined. When pin SS is coupled to external soft start capacitor Cext, soft start reference signal SSB increases, and the soft start time period of switching converter 100 is related to a capacitance of external soft start capacitor Cext. In one embodiment, the soft start time period of switching converter 100 is regulated through adjusting the capacitance of external soft start capacitor Cext. Error amplifier 12 is configured to receive soft start reference signal SSB, an output reference signal Vref and voltage feedback signal VFB, and is configured to provide an error signal Ve. When soft start reference signal SSB is less than output reference signal Vref, error amplifier 12 is configured to provide error signal Ve based on a difference between soft start reference signal SSB and voltage feedback signal VFB, and when soft start reference signal SSB is larger than output reference signal Vref, error amplifier 12 is configured to provide error signal Ve based on a difference between output reference signal Vref and voltage feedback signal VFB. Slope compensation circuit 13 is configured to provide a slope signal RAMP. In one embodiment, slope signal RAMP is generated by an oscillator. Logic circuit 14 is coupled to error amplifier 12 to receive error signal Ve, coupled to slope compensation circuit 13 to receive slope signal RAMP, and is configured to provide switching control signal CTRL based on error signal Ve and slope signal RAMP to control a switch in switching circuit 15. In one embodiment, logic circuit 14 is configured to turn ON the switch in switching circuit 15 based on slope signal RAMP. As a result, a switching period of switching circuit 15 is controlled. And logic circuit 14 is configured to turn OFF the switch in switching circuit 15 based on a comparison result between error signal Ve and slope signal RAMP. As a result, a duty cycle of switching circuit 15 is controlled to adjust output voltage Vo. In the embodiment shown in FIG. 1, switching circuit 15 comprises switches S1 and S2. Switches S1 and S2 are turned ON complementary under control of switching control signal CTRL. In one embodiment, switch S1 has a first terminal coupled to pin IN to receive input voltage Vin, a second terminal coupled to pin SW, and a control terminal coupled to switching control signal CTRL. Switch S2 has a first terminal coupled to the second terminal of switch S1 and pin SW, a second terminal coupled to the system ground, and a control terminal coupled to switching control signal CTRL. One of ordinary skill in the art will appreciate that switch S1 and/or switch S2 may be integrated on integrated circuit 10.

In the embodiment shown in FIG. 1, it is flexible to choose internal soft start or external soft start through soft start circuit 11. When pin SS is coupled to external soft start capacitor Cext, soft start reference signal SSB is generated based on an internal soft start voltage provided by soft start circuit 11 and an external soft start voltage. In one embodiment, when increasing rate of the external soft start voltage is less than increasing rate of the internal soft start voltage, soft start reference signal SSB and the soft start time period are controlled based on the external soft start voltage. When pin SS is floating, soft start reference signal SSB and the soft start time period are controlled based on the internal soft start voltage. The soft start time period is defined to be related with a time interval that soft start reference signal SSB increases from zero to output reference signal Vref, or be related with a time interval that output voltage Vo increases from zero to a target output voltage.

Figure 2:
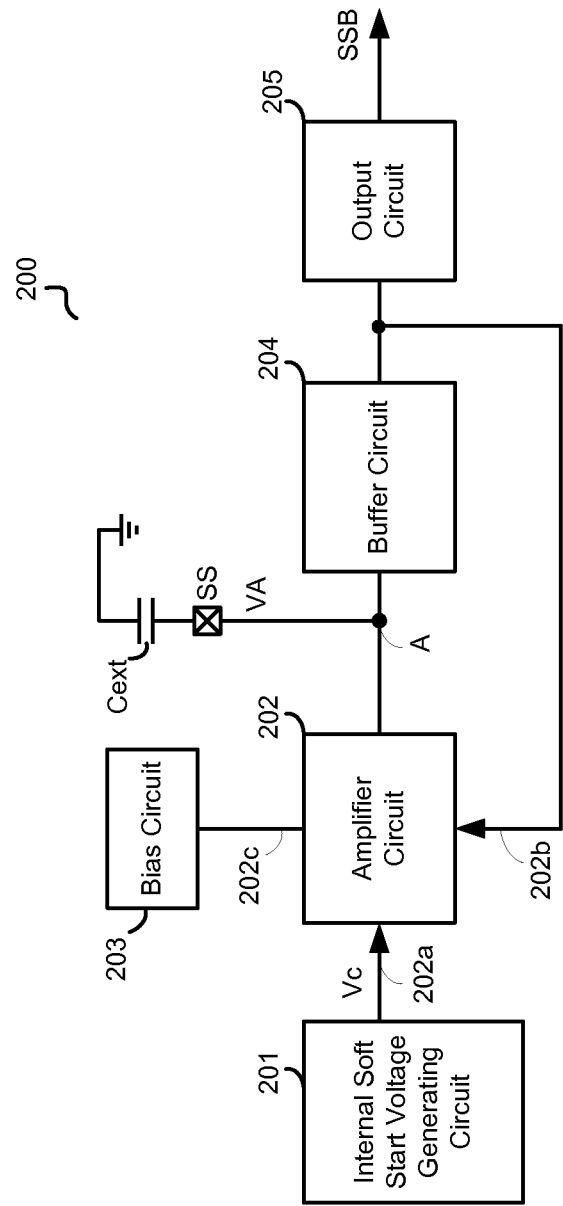
FIG. 2 illustrates a block diagram of a soft start circuit 200 according to an embodiment of the present invention.

FIG. 2 illustrates a block diagram of a soft start circuit 200 according to an embodiment of the present invention. Soft start circuit 200 comprises an internal soft start voltage generating circuit 201, an amplifier circuit 202, a bias circuit 293, a buffer circuit 204, and an output circuit 205.

Internal soft start voltage generating circuit 201 is configured to provide an internal soft start voltage Vc. Amplifier circuit 202 has a first input terminal 202a, a second input terminal 202b, a bias input terminal 202c and an output terminal A, wherein the first input terminal 202a is couple to internal soft start voltage generating circuit 201 to receive internal soft start voltage Vc, the second input terminal 202b is coupled to an output terminal of buffer circuit 204 to receive soft start reference signal SSB or a feedback signal indicative of soft start reference signal SSB, bias input terminal 202c is coupled to an output terminal of bias circuit 203, and output terminal A is coupled to pin SS of integrated circuit 10. Bias circuit 203 is configured to provide a bias current for amplifier circuit 202. When pin SS is coupled to external soft start capacitor Cext, amplifier circuit 202 is configured to charge external soft start capacitor Cext, a voltage VA across external soft start capacitor Cext is the external soft start voltage. Buffer circuit 204 has an input terminal coupled to output terminal A of amplifier circuit 202, and an output terminal configured to provide soft reference signal SSB. Buffer circuit 204 is configured to provide soft start reference signal SSB through output circuit 205. Output circuit 205 is configured to adjust a proportion between soft start reference signal SSB and internal soft start voltage Vc, or a proportion between soft start reference signal SSB and external soft start voltage VA.

In one embodiment, when pin SS is floating, during startup of switching converter 100, internal soft start voltage generating circuit 201 is configured to provide internal soft start voltage Vc with a fixed increasing rate, and soft start circuit 200 is configured to provide soft start reference signal SSB based on internal soft start voltage Vc to control the soft start time period of switching converter 100. In one embodiment, when pin SS is coupled to external soft start capacitor Cext, internal soft start voltage generating circuit 201 is configured to provide internal soft start voltage Vc with the fixed increasing rate, and external soft start capacitor Cext is charged by amplifier circuit 202 to provide external soft start voltage VA, and soft start circuit 200 is configured to provide soft start reference signal SSB based on external soft start voltage VA and internal soft start voltage Vc. In one embodiment, soft start reference signal SSB is determined by one of internal soft start voltage Vc and external soft start voltage VA which has a slower increasing rate.

Embodiment shown in FIG. 2 can be configured as external soft start or internal soft start flexible, and different soft start time period can be achieved with a simple circuit.

Figure 3:
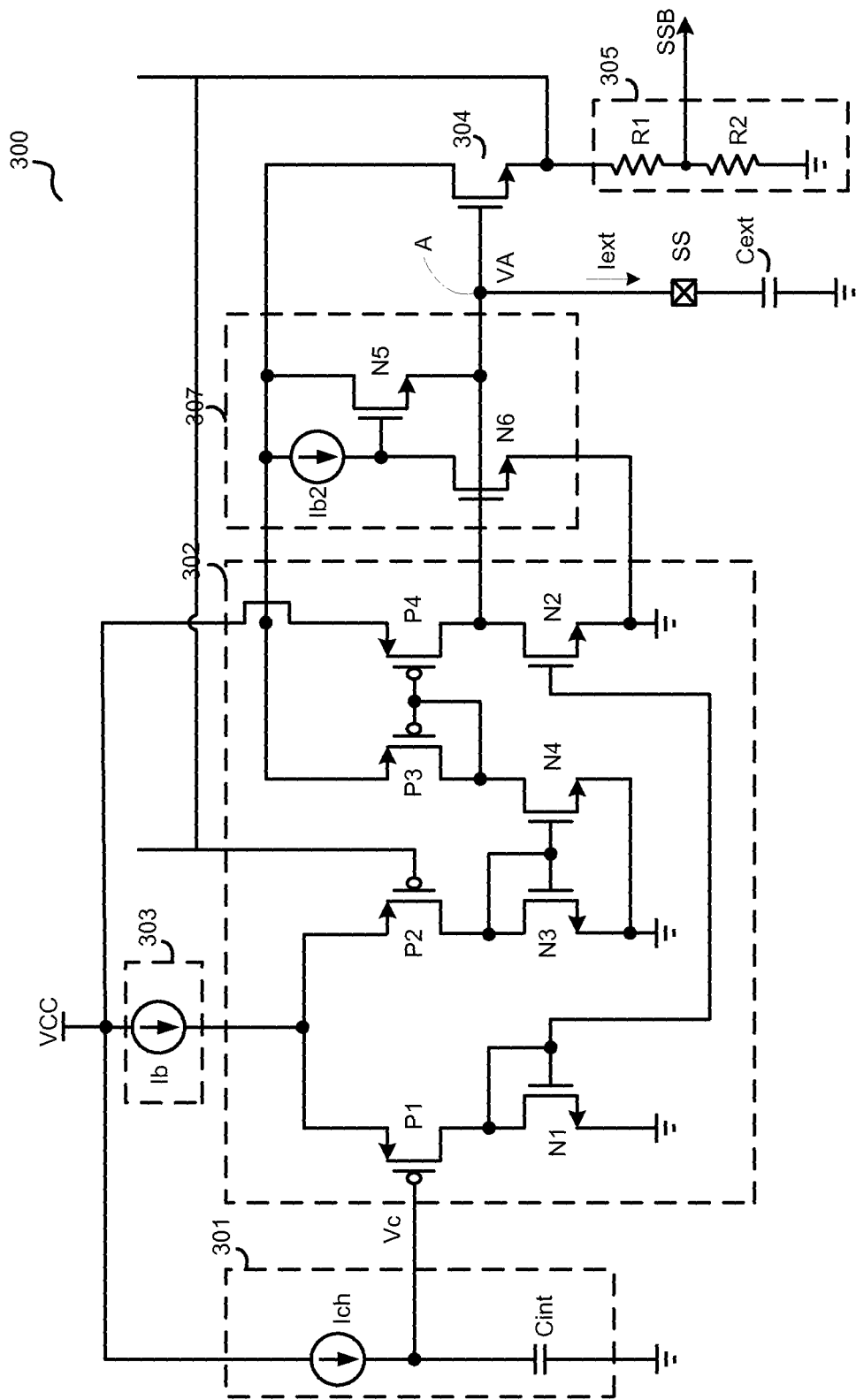
FIG. 3 illustrates a circuit diagram of a soft start circuit 300 according to an embodiment of the present invention.

FIG. 3 illustrates a circuit diagram of a soft start circuit 300 according to an embodiment of the present invention. Soft start circuit 300 comprises an internal soft start voltage generating circuit 301, an amplifier circuit 302, a bias circuit 303, a buffer circuit comprising a Metal-Oxide-Semiconductor Field-Effect Transistor (MOSFET) 304, and an output circuit 305.

Internal soft start voltage generating circuit 301 comprises a current source Ich and an internal soft start capacitor Cint. Internal soft start capacitor Cint is charged by current source Ich, and a voltage across internal soft start capacitor Cint is internal soft start voltage Vc. In one embodiment, current source Ich has a first terminal coupled to an auxiliary power supply voltage VCC, and a second terminal coupled to a first terminal of internal soft start capacitor Cint. A second terminal of internal soft start capacitor Cint is coupled to the system ground. Bias circuit 303 comprises a current source Ib. Current source Ib has a first terminal coupled to auxiliary power supply voltage VCC, and a second terminal configured to provide a bias current Ib. Current source Ib may be implement by a current mirror. Symbol "Ich" represents current source Ich or a charging current Ich used to charge internal soft start capacitor Cint. Symbol "Ib" represents current source Ib or bias current Ib provided by bias circuit 303.

In the embodiment shown in FIG. 3, amplifier circuit 302 comprises a differential input circuit comprising a P-channel Field Effect Transistor (FET) P1 and a P-channel Field Effect Transistor P2, a first pair of transistors comprising an N-channel Field Effect Transistor N1 and an N-channel Field Effect Transistor N2, a second pair of transistors comprising an N-channel Field Effect Transistor N3 and an N-channel Field Effect Transistor N4, a third pair of transistors comprising a P-channel Field Effect Transistor P3 and a P-channel Field Effect Transistor P4. Gate of P-channel Field Effect Transistor P1 is employed as one input terminal of amplifier circuit 302, and Gate of P-channel Field Effect Transistor P1 is coupled to internal soft start capacitor Cint to receive internal soft start voltage Vc, Gate of P-channel Field Effect Transistor P2 is employed as the other input terminal of amplifier circuit 302, and gate of P-channel Field Effect Transistor P2 is coupled to an output terminal of buffer circuit 304. Source of P-channel Field Effect Transistor P1 and source of P-channel Field Effect Transistor P2 are coupled to current source Ib together. Drain of P-channel Field Effect Transistor P1 is coupled to gate of N-channel Field Effect Transistor N1, drain of N-channel Field Effect Transistor N1, and gate of N-channel Field Effect Transistor N2. Source of N-channel Field Effect Transistor N1 and source of N-channel Field Effect Transistor N2 are coupled to the system ground. Drain of P-channel Field Effect Transistor P2 is coupled to gate of N-channel Field Effect Transistor N3, drain of N-channel Field Effect Transistor N3, and gate of N-channel Field Effect Transistor N4. Source of N-channel Field Effect Transistor N3 and source of N-channel Field Effect Transistor N4 are coupled to the system ground. Drain of N-channel Field Effect Transistor N4 is coupled to gate of P-channel Field Effect Transistor P3, drain of P-channel Field Effect Transistor P3, and gate of P-channel Field Effect Transistor P4. Source of P-channel Field Effect Transistor P3 and source of P-channel Field Effect Transistor P4 are coupled to auxiliary power supply voltage VCC. Drain of P-channel Field Effect Transistor P4 and drain of N-channel Field Effect Transistor N2 are coupled together as output terminal A of amplifier circuit 302. One of ordinary skill in the art will appreciate that amplifier circuit 302 is not limited by the embodiment shown in FIG. 3. One of ordinary skill in the art will also appreciate that a type of transistors used in amplifier circuit 302 is not limited by the embodiment shown in FIG. 3.

Gate of MOSFET 304 is employed as an input terminal of the buffer circuit, and gate of MOSFET 304 is coupled to output terminal A of amplifier circuit 302. Drain of MOSFET 304 is coupled to auxiliary power supply voltage VCC. Source of MOSFET 304 is employed as an output terminal of the buffer circuit, and is configured to provide soft start reference signal SSB through output circuit 305. As shown in FIG. 3, MOSFET 304 is an N channel MOSFET. However, one of ordinary skill in the art will appreciate that the buffer circuit may comprise other suitable device, such as Bipolar Junction Transistor, P-channel MOSFET, and so on.

Output circuit 305 comprises resistors R1 and R2, wherein one terminal of resistor R1 is coupled to source of MOSFET 304, the other terminal of resistor R1 is coupled to one terminal of resistor R2, and the other terminal of resistor R2 is coupled to the system ground. A common node of resistors R1 and R2 is configured as the output terminal of output circuit 305 to provide soft start reference signal SSB. In one embodiment, a proportion between soft start reference signal SSB and internal soft start voltage Vc or a proportion between soft start reference signal SSB and external soft start voltage VA may be adjusted by adjusting resistance of resistor R1 and/or resistance of resistor R2.

In one embodiment, when pin SS is floating, soft start reference signal SSB is determined by current source Ich, internal soft start capacitor Cint, and resistors R1 and R2. During startup of switching converter 100, internal soft start capacitor Cint is charged by current source Ich, internal soft start voltage Vc increases with a fixed slope, and soft start reference signal SSB increases with internal soft start voltage Vc. In one embodiment, internal soft start voltage Vc increases with a slope Dvc/Dt which is determined by a flowing equation (1):

$$Dvc/Dt=Ich/Cint \tag{1}$$

In one embodiment, soft start reference signal SSB equals Vc*R2/(R1+R2).

In one embodiment, when pin SS is coupled to external soft start capacitor Cext, internal soft start capacitor Cint is charged by current source Ich, internal soft start voltage Vc increases with slope Dvc/Dt as described in equation (1). External soft start capacitor Cext is charged by current source Ib through amplifier circuit 302. As shown in FIG. 3, external soft start capacitor Cext is charged directly by a current Iext, external soft start voltage VA increases. Soft start reference signal SSB is determined by one of internal soft start voltage Vc and external soft start voltage VA which has slower increasing slope. Amplifier circuit 302 is configured to adjust current Iext based on internal soft start voltage Vc and external soft start voltage VA, where 0<=Iext<=Ib. In one embodiment, external soft start voltage VA increases with a slope Dva/Dt which is determined by a flowing equation (2):

$$Dva/Dt=Iext/Cext \tag{2}$$

The embodiment shown in FIG. 3 further comprises a clamping circuit 307.

At the beginning of startup of switching converter 100, output terminal A of amplifier circuit 302 increases quickly to a gate threshold voltage VGSth of MOSFET 304 under an effect of clamping circuit 307, and MOSFET 304 is turned ON accordingly. In the embodiment shown in FIG. 3, clamping circuit 307 comprises a bias current source Ib2, a MOSFET N5, and a MOSFET N6. One terminal of bias current source Ib2 is coupled to auxiliary power supply voltage VCC, the other terminal of bias current source Ib2 is coupled to gate of MOSFET N5 and drain of MOSFET N6. Drain of MOSFET N5 is coupled to auxiliary power supply voltage VCC, and source of MOSFET N5 and gate of MOSFET N6 are coupled to output terminal A of amplifier circuit 302, source of MOSFET N6 is coupled to the system ground.

Figure 4:
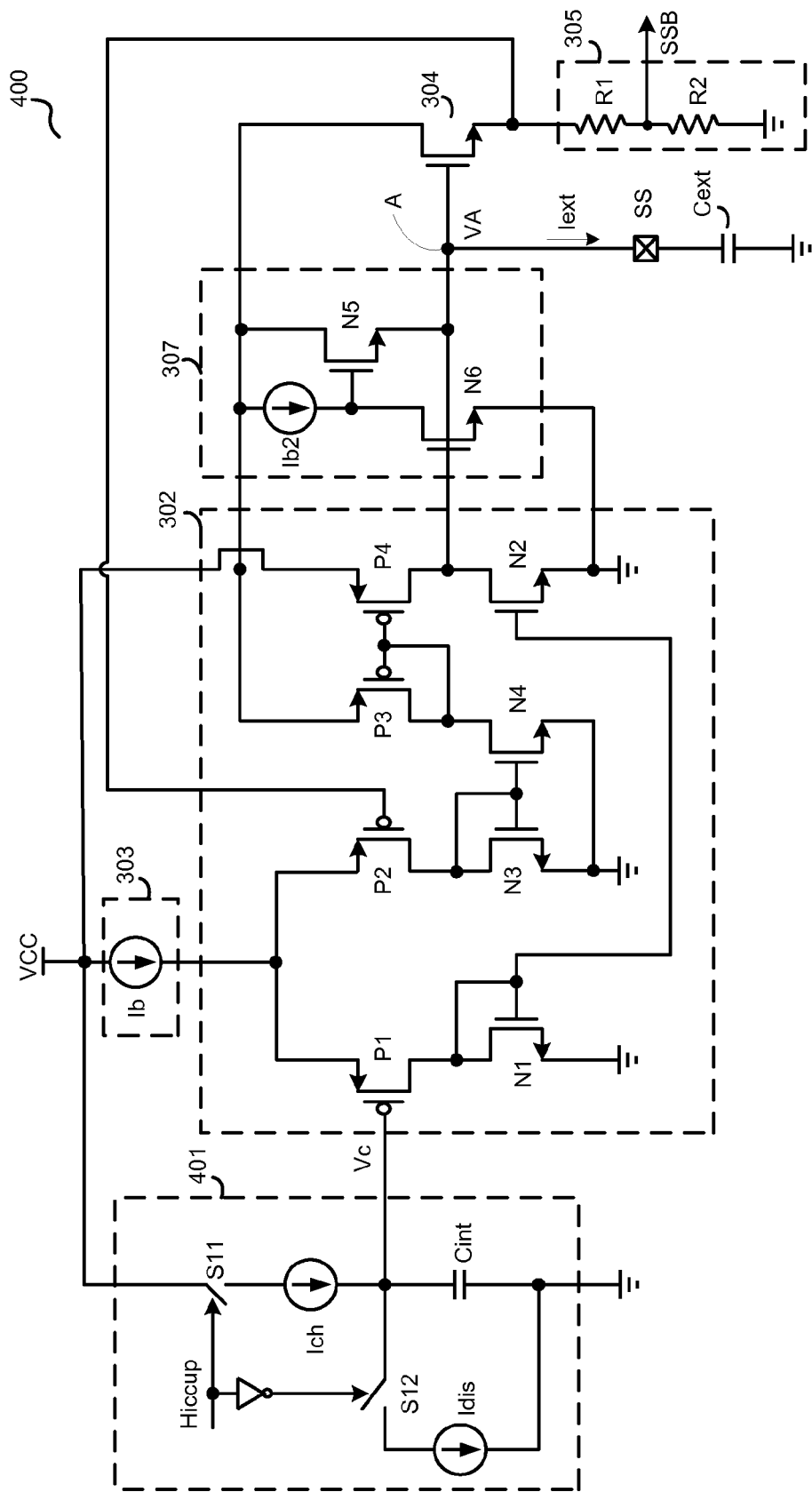
FIG. 4 illustrates a circuit diagram of a soft start circuit 400 according to another embodiment of the present invention.

FIG. 4 illustrates a circuit diagram of a soft start circuit 400 according to another embodiment of the present invention. Soft start circuit 400 is similar with soft start circuit 300. For simplicity, only differences between soft start circuit 400 and soft start circuit 300 are described herein after. An internal soft start circuit 401 shown in FIG. 4 comprises a switch S11, a switch S12, current source Ich, a current source Idis, and internal soft start capacitor Cint. Switch S11 is coupled to current source Ich, switch S12 is coupled to current source Idis, and switch S11 and switch S12 are turned ON complementary under control of a hiccup signal Hiccup. When switch S11 is turned ON and switch S12 is turned OFF, internal soft start capacitor Cint is charged by current source Ich, and when switch S12 is turned ON and switch S11 is turned OFF, internal soft start capacitor Cint is discharged by current source Idis.

In one embodiment, switching converter 100 enters into a hiccup mode when a fault condition is detected, the fault may be short circuit, over current or other fault conditions. In the hiccup mode, switching converter 100 tries to restart automatically until the fault condition is eliminated or switching converter 100 is completely shut down.

In one embodiment, when pin SS is coupled to external soft start capacitor Cext, during startup of switching converter 100, hiccup signal Hiccup is at a first state, switch S11 is turned ON and switch S12 is turned OFF, internal soft start capacitor Cint is charged by current source Ich, internal soft start voltage Vc increases with a slope determined by equation (1), external soft start capacitor Cext is charged by current Iext, and external soft start voltage VA increases with a slope determined by equation (2). Soft start reference signal SSB is determined by one of internal soft start voltage Vc and external soft start voltage VA which has a slower increasing slope. As a result, the soft start time period of switching converter 100 is determined by internal soft start voltage Vc and/or external soft start voltage VA. In one embodiment, charging current Iext is adjusted automatically by amplifier circuit 302 based on internal soft start voltage Vc and external soft start voltage VA, where 0<=Iext<=Ib. When switching converter 100 does not work normally after soft start, i.e., output voltage Vo does not reach the target output voltage, then hiccup signal Hiccup becomes a second state, switch S11 is turned OFF and switch S12 is turned ON, internal soft start capacitor Cint is discharged by current source Idis, internal soft start voltage Vc decreases, and external soft start capacitor Cext is discharged by current source Ib through amplifier circuit 302, external soft start voltage VA decreases. Soft start reference signal SSB is determined by one of internal soft start voltage Vc and external soft start voltage VA which has a slower decreasing slope. When soft start reference signal SSB decreases to a minimum voltage level, such as zero, switching converter 100 tries to restart again, and hiccup signal Hiccup becomes the first state again. Internal soft start capacitor Cint is charged by current source Ich, and external soft start capacitor Cext is charged by current source Ib. Above process repeats until switching converter 100 works normally or is shut down completely since number of restarting achieves an upper limit.

In the embodiment shown in FIG. 4, a time interval between two adjacent restarting processes is adjusted by current source Idis, i.e., a time period that hiccup signal Hiccup maintains at the second state is adjusted by current source Idis.

Figure 5:
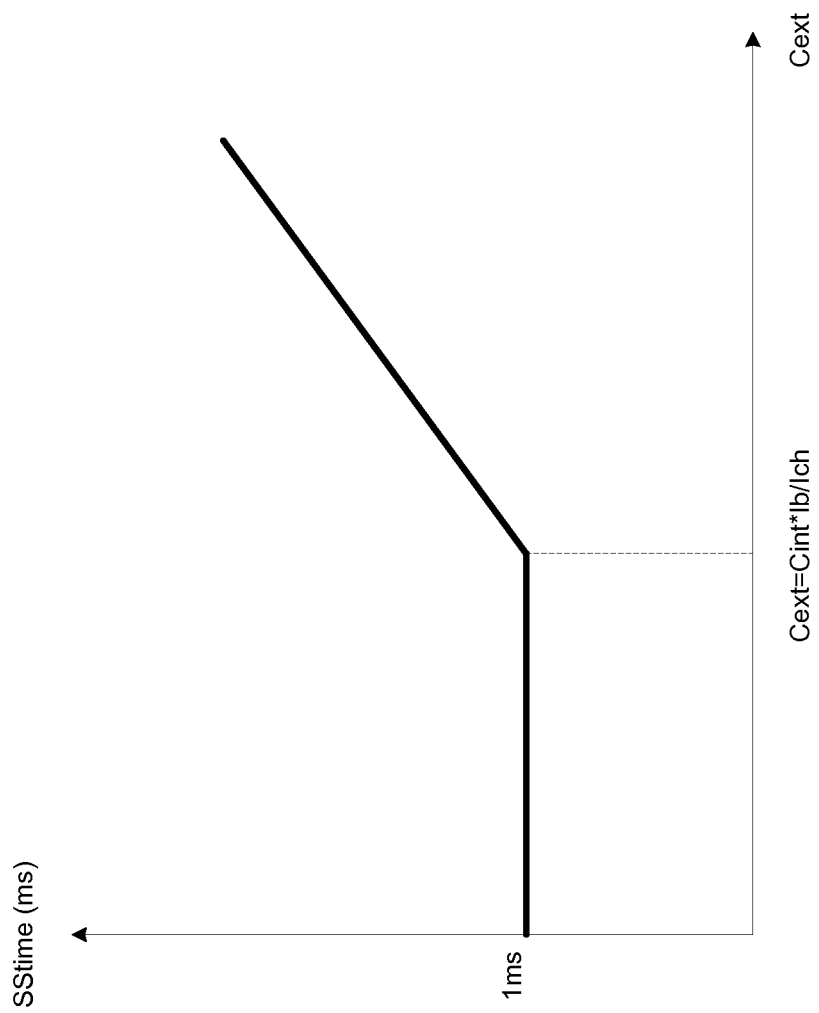
FIG. 5 shows a diagram illustrating a relation between a soft start time period and an external soft start capacitor shown in soft start circuit 300 with reference to FIG. 3 according to an embodiment of the present invention.

FIG. 5 shows a diagram illustrating a relation between a soft start time period and an external soft start capacitor shown in soft start circuit 300 with reference to FIG. 3 according to an embodiment of the present invention. As shown in FIG. 5, when capacitance of external soft start capacitor Cext is smaller than Cint*Ib/Ich, soft start circuit 300 chooses internal soft start, soft start reference signal SSB is generated based on internal soft start voltage Vc, where Cint represents capacitance of internal soft start capacitor Cint. As a result, soft start time period SStime is predetermined, such as equals 1 ms. When capacitance of external soft start capacitor Cext is larger than Cint*Ib/Ich, soft start circuit 300 chooses external soft start, soft start reference signal SSB is generated based on external soft start voltage VA, and soft start time period SStime increases when capacitance of external soft start capacitor Cext increases.

Figure 6:
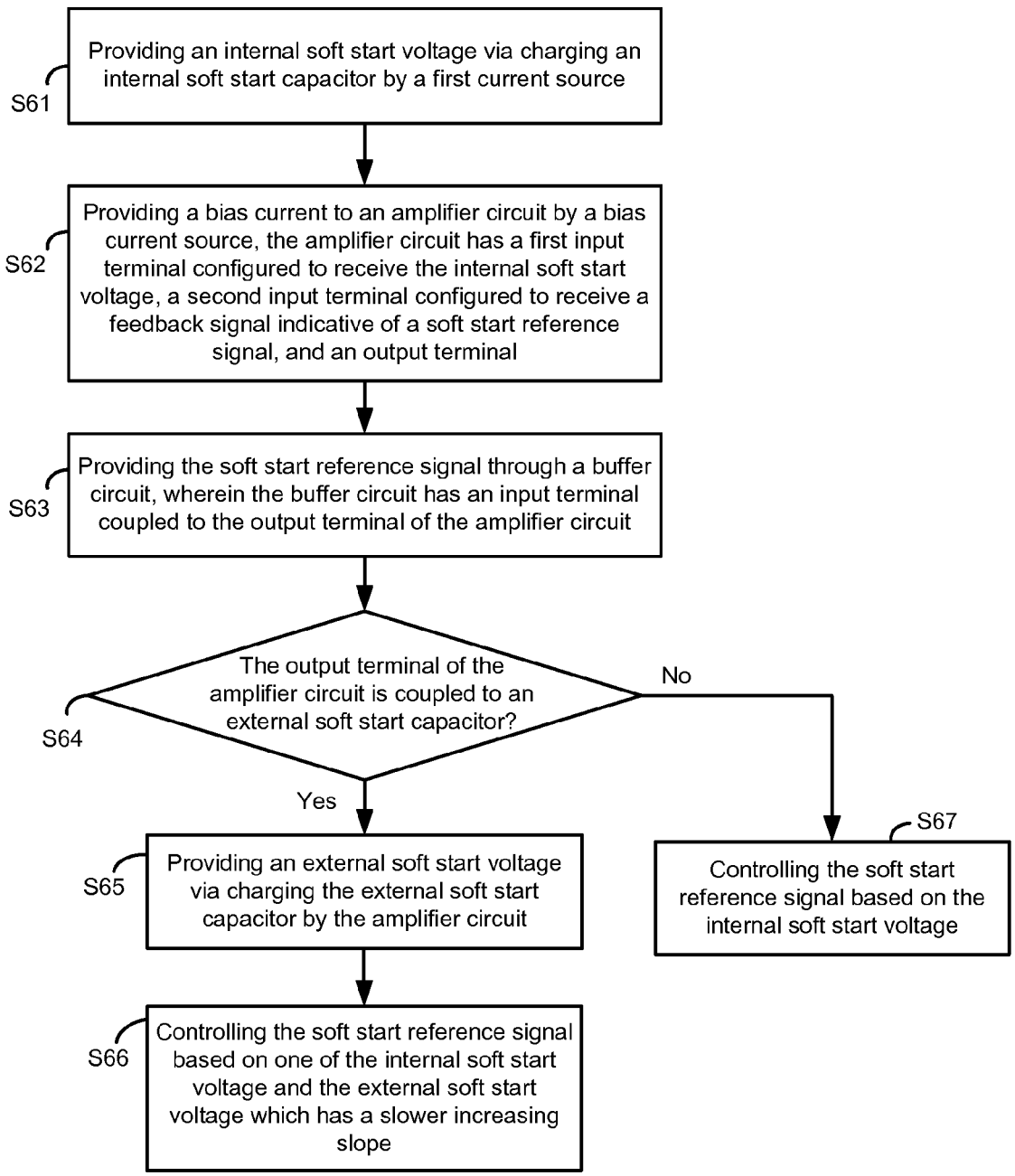
FIG. 6 shows a flow chart illustrating a soft start control method for a switching converter according to an embodiment of the present invention.

FIG. 6 shows a flow chart illustrating a soft start control method for a switching converter according to an embodiment of the present invention. The soft start control method comprises steps S61-S67.

At step S61, providing an internal soft start voltage via charging an internal soft start capacitor by a first current source.

At step S62, providing a bias current to an amplifier circuit by a bias current source, wherein the amplifier circuit has a first input terminal configured to receive the internal soft start voltage, a second input terminal configured to receive a feedback signal indicative of a soft start reference signal, and an output terminal.

At step S63, providing the soft start reference signal through a buffer circuit, wherein the buffer circuit has an input terminal coupled to the output terminal of the amplifier circuit.

At step S64, judging if the output terminal of the amplifier circuit is coupled to an external soft start capacitor. When the output terminal of the amplifier circuit is coupled to the external soft start capacitor, then go to step S65-S66, otherwise go to step S67.

At step S65, providing an external soft start voltage via charging the external soft start capacitor by the amplifier circuit.

At step S66, controlling the soft start reference signal based on one of the internal soft start voltage and the external soft start voltage which has a slower increasing slope, as a result, a soft start time period is controlled.

At step S67, controlling the soft start reference signal based on the internal soft start voltage. As a result, the soft start time period is controlled.

It is noted that in the flow chart described above, the functional boxes may be implemented as a different sequence. For example, two functional boxes in succession shown in FIG. 6 may be executed in parallel or in a reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A soft start circuit for a switching converter, the soft start circuit comprising:
   an internal soft start voltage generating circuit having an output terminal configured to provide an internal soft start voltage;
   an amplifier circuit having a first input terminal, a second input terminal and an output terminal, wherein the first input terminal is coupled to the output terminal of the internal soft start voltage generating circuit to receive the internal soft start voltage, and the second input terminal is configured to receive a soft start reference signal or a feedback signal indicative of the soft start reference signal; and
   a buffer circuit having an input terminal and an output terminal, wherein the input terminal is coupled to the output terminal of the amplifier circuit, and the output terminal is configured to provide the soft start reference signal; wherein
   when the output terminal of the amplifier circuit is coupled to an external soft start capacitor, the external soft start capacitor is charged by the amplifier circuit to provide an external soft start voltage, and the soft start circuit is configured to provide the soft start reference signal based on the internal soft start voltage and the external soft start voltage.

2. The soft start circuit of claim 1, wherein the amplifier circuit is configured to adjust a current flowing into the external soft start capacitor based on the external soft start voltage and the internal soft start voltage.

3. The soft start circuit of claim 1, wherein the internal soft start voltage generating circuit further comprising:
   a first current source; and
   an internal soft start capacitor coupled to the first current source, the internal soft start capacitor is charged by the first current source and is configured to provide the internal soft start voltage.

4. The soft start circuit of claim 1, wherein the internal soft start voltage generating circuit further comprising:
   a first current source;
   a second current source; and
   an internal soft start capacitor coupled to the first current source through a first switch, and coupled to the second current source through a second switch; wherein
   when a hiccup signal is at a first state, the first switch is turned ON and the second switch is turned OFF, the internal soft start capacitor is charged by the first current source; and wherein
   when the hiccup signal is at a second state, the first switch is turned OFF and the first switch is turned ON, the internal soft start capacitor is discharged by the second current source.

5. The soft start circuit of claim 1, further comprising:
   a bias circuit having an output terminal configured to provide a bias current, wherein the bias current is configured to charge the external soft start capacitor through the amplifier circuit; wherein
   a current flowing into the external soft start capacitor is smaller than the bias current.

6. The soft start circuit of claim 5, wherein the amplifier circuit further comprising:
   a differential input circuit comprising a first P-channel FET and a second P-channel FET, wherein a gate of the first P-channel FET is coupled to the output terminal of the internal soft start voltage generating circuit, a gate of the second P-channel FET is coupled to the output terminal of the buffer circuit, and a source of the first P-channel FET and a source of the second P-channel FET are coupled to the output terminal of the bias circuit;
   a first pair of transistors comprising a first N-channel FET and a second N-channel FET, wherein a gate of the first N-channel FET, a drain of the first N-channel FET and a gate of the second N-channel FET are coupled to a drain of the first P-channel FET, a source of the first N-channel FET and a source of the second N-channel FET are coupled to a system ground, and a drain of the second N-channel FET is coupled to the output terminal of the amplifier circuit;
   a second pair of transistors comprising a third N-channel FET and a fourth N-channel FET, wherein a gate of the third N-channel FET, a drain of the third N-channel FET and a gate of the fourth N-channel FET are coupled to a drain of the second P-channel FET, and a source of the third N-channel FET and a source of the fourth N-channel FET are coupled to the system ground; and
   a third pair of transistors comprising a third P-channel FET and a fourth P-channel FET, wherein a gate of the third P-channel FET, a drain of the third P-channel FET and a gate of the fourth P-channel FET are coupled to a drain of the fourth N-channel FET, a source of the third P-channel FET and a source of the fourth P-channel FET are coupled to an auxiliary power supply voltage, and a drain of the fourth P-channel FET is coupled to the drain of the second N-channel FET and the output terminal of the amplifier circuit.

7. The soft start circuit of claim 1, wherein the buffer circuit further comprising a fifth N-channel FET, wherein a gate of the fifth N-channel FET is coupled to the output terminal of the amplifier circuit, a drain of the fifth N-channel FET is coupled to an auxiliary power supply voltage, and a source of the fifth N-channel FET is configured to provide the soft start reference signal.

8. The soft start circuit of claim 1, further comprising:
   a third current source having a first terminal and a second terminal, wherein the first terminal is coupled to an auxiliary power supply voltage;
   a first clamping switch having a first terminal, a second terminal and a control terminal, wherein the first terminal is coupled to the output terminal of the amplifier circuit, the second terminal is coupled to the auxiliary power supply voltage, and the control terminal is coupled to the second terminal of the third current source; and
   a second clamping switch having a first terminal, a second terminal and a control terminal, wherein the first terminal is coupled to a system ground, the second terminal is coupled to the second terminal of the third current source, and the control terminal is coupled to the output terminal of the amplifier circuit; and wherein when the switching converter begins startup, a voltage at the output terminal of the amplifier circuit increases to turn ON the buffer circuit.

9. A switching converter integrated on an integrated circuit, wherein the integrated circuit having a soft start pin, the switching converter comprising:
   an output terminal configured to provide an output voltage;
   an error amplifier configured to receive a soft start reference signal, an output reference signal and an output feedback signal indicative of the output voltage, wherein the error amplifier is configured to provide an error signal based on the soft start reference signal, the output reference signal and the output feedback signal;
   a slope compensation circuit configured to provide a slope signal;
   a logic circuit coupled to the error amplifier and the slope compensation circuit to receive the error signal and the slope signal, the logic circuit is configured to provide a switching control signal based on the error signal and the slope signal;
   a switch configured to be turned ON and turned OFF by the switching control signal; and
   a soft start circuit comprising:
      a first current source configured to provide a first current;
      an internal soft start capacitor coupled to the first current source, the internal soft start capacitor is charged by the first current and is configured to provide an internal soft start voltage;
      an amplifier circuit having a first input terminal, a second input terminal and an output terminal, wherein the first input terminal is coupled to the internal soft start capacitor to receive the internal soft start voltage, the second input terminal is configured to receive the soft start reference signal, and the output terminal is coupled to the soft start pin;
      a bias current source comprising an output terminal configured to provide a bias current to the amplifier circuit; and
      a buffer circuit having an input terminal and an output terminal, wherein the input terminal is coupled to the output terminal of the amplifier circuit, and the output terminal is configured to provide the soft start reference signal.

10. The switching converter of claim 9, wherein when the soft start pin is coupled to an external soft start capacitor, the external soft start capacitor is charged by the amplifier circuit to provide an external soft start voltage, and the soft start reference signal is provided based on the internal soft start voltage and the external soft start voltage.

11. The switching converter of claim 10, wherein a soft start time period of the switching converter is adjusted based on the external soft start capacitor when a capacitance of the external soft start capacitor is larger than a predetermined value which is determined by the bias current, the first current and a capacitance of the internal soft start capacitor.

12. The switching converter of claim 9, wherein when the soft start pin is floating, the soft start reference signal is provided based on the internal soft start voltage.

13. The switching converter of claim 9, wherein the amplifier circuit is configured to charge an external soft start capacitor coupled to the soft start pin, wherein a current flowing into the external soft start capacitor is smaller than the bias current.

14. The switching converter of claim 9, wherein the amplifier circuit further comprising:
   a differential input circuit comprising a first P-channel FET and a second P-channel FET, wherein a gate of the first P-channel FET is coupled to the internal soft start capacitor, a gate of the second P-channel FET is coupled to the output terminal of the buffer circuit, and a source of the first P-channel FET and a source of the second P-channel FET are coupled to the output terminal of the bias current source;
   a first pair of transistors comprising a first N-channel FET and a second N-channel FET, wherein a gate of the first N-channel FET, a drain of the first N-channel FET and a gate of the second N-channel FET are coupled to a drain of the first P-channel FET, a source of the first N-channel FET and a source of the second N-channel FET are coupled to a system ground, and a drain of the second N-channel FET is coupled to the output terminal of the amplifier circuit;
   a second pair of transistors comprising a third N-channel FET and a fourth N-channel FET, wherein a gate of the third N-channel FET, a drain of the third N-channel FET and a gate of the fourth N-channel FET are coupled to a drain of the second P-channel FET, and a source of the third N-channel FET and a source of the fourth N-channel FET are coupled to the system ground; and
   a third pair of transistors comprising a third P-channel FET and a fourth P-channel FET, wherein a gate of the third P-channel FET, a drain of the third P-channel FET and a gate of the fourth P-channel FET are coupled to a drain of the fourth N-channel FET, a source of the third P-channel FET and a source of the fourth P-channel FET are coupled to an auxiliary power supply voltage, and a drain of the fourth P-channel FET is coupled to the drain of the second N-channel FET and the output terminal of the amplifier circuit.

15. The switching converter of claim 9, wherein the buffer circuit further comprising a fifth N-channel FET, wherein a gate of the fifth N-channel FET is coupled to the output terminal of the amplifier circuit, a drain of the fifth N-channel FET is coupled to an auxiliary power supply voltage, and a source of the fifth N-channel FET is configured to provide the soft start reference signal.

16. A soft start method for a switching converter, comprising:
providing an internal soft start voltage through charging an internal soft start capacitor by a first current;
providing a bias current to an amplifier circuit, wherein the amplifier circuit comprising a first input terminal configured to receive the internal soft start voltage, a second input terminal configured to receive a soft start reference signal or a feedback signal indicative of the soft start reference signal and an output terminal;
providing an external soft start voltage through charging an external soft start capacitor by the amplifier circuit, wherein the external soft start capacitor is coupled to the output terminal of the amplifier circuit;
providing the soft start reference signal through a buffer circuit, wherein the buffer circuit has an input terminal coupled to the output terminal of the amplifier circuit; and
controlling a soft start time period of the switching converter based on the internal soft start voltage and an external soft start voltage.

17. The soft start method of claim 16, wherein the soft start time period of the switching converter is adjusted based on the external soft start voltage when a capacitance of the external soft start capacitor is larger than a predetermined value.

18. The soft start method of claim 17, wherein the predetermined value equals Cint*Ib/Ich, where Cint represents a capacitance of the internal soft start capacitor, Ib represents the bias current, and Ich represents the first current.

19. The soft start method of claim 16, wherein the soft start time period of the switching converter is controlled by one of the internal soft start voltage and the external soft start voltage which has a slower increasing slope.

20. The soft start method of claim 16, wherein a current flowing into the external soft start capacitor varies with the internal soft start voltage and the external soft start voltage.

* * * * *